(12) United States Patent
Keller et al.

(10) Patent No.: US 12,579,232 B1
(45) Date of Patent: Mar. 17, 2026

(54) SYSTEMS AND METHODS FOR AUTOMATIC AUTHENTICATION STAGING

(71) Applicant: Wells Fargo Bank, N.A., San Francisco, CA (US)

(72) Inventors: Joyce Keller, Charlotte, NC (US); Joseph de Bruin Tennis, Charlotte, NC (US); Matthew N. Wheeler, Charlotte, NC (US); Ila Patel, Charlotte, NC (US); John Andrew Chuprevich, Charlotte, NC (US); William J. Bailey, Charlotte, NC (US); Ling Yee Lindy Sin, San Francisco, CA (US)

(73) Assignee: Wells Fargo Bank, N.A, San Francisco, CA (US)

( * ) Notice: Subject to any disclaimer, the term of this patent is extended or adjusted under 35 U.S.C. 154(b) by 316 days.

(21) Appl. No.: 18/176,250

(22) Filed: Feb. 28, 2023

(51) Int. Cl.
*G06F 21/31* (2013.01)
*G06F 21/32* (2013.01)

(52) U.S. Cl.
CPC ............ *G06F 21/316* (2013.01); *G06F 21/32* (2013.01)

(58) Field of Classification Search
CPC ............................... G06F 21/316; G06F 21/32
USPC ............................................................. 726/7
See application file for complete search history.

(56) References Cited

U.S. PATENT DOCUMENTS

| | | | |
|---|---|---|---|
| 11,030,840 B2 | 6/2021 | Williams et al. | |
| 2018/0365899 A1* | 12/2018 | Wolf ...................... | G06F 3/0482 |
| 2019/0005215 A1* | 1/2019 | Faivre ................... | G06F 21/316 |
| 2019/0156345 A1 | 5/2019 | Chen et al. | |
| 2021/0011986 A1 | 1/2021 | Tussy | |
| 2023/0054831 A1* | 2/2023 | Yunke ...................... | G07C 9/27 |

FOREIGN PATENT DOCUMENTS

JP 2016033714 A * 3/2016

* cited by examiner

*Primary Examiner* — Jacob Lipman
(74) *Attorney, Agent, or Firm* — K&L Gates LLP

(57) ABSTRACT

Systems, apparatuses, methods, and computer program products are disclosed for providing a user authentication determination pertaining to a first user. An example method includes receiving user identification indications. The example method further includes determining user identification feature confidence scores based on the user identification indications and one or more user profile features associated with the first user, and determining authentication requirements required for the first user for each inferred user visit reason determined for the user. The example method further includes performing user authentication determinations based on the user identification feature confidence scores and the authentication requirements, and providing a user information report, wherein the user information report includes the user authentication determinations.

20 Claims, 10 Drawing Sheets

SYSTEMS AND METHODS FOR AUTOMATIC AUTHENTICATION STAGING

BACKGROUND

Although e-commerce now provides a large share of business transactions, traditional face-to-face-interaction with customers still plays an indispensable role for many industries. However, brick-and-mortar locations must offer the same level of digital security as online transactions, which may be a time-consuming process and degrade the customer's experience in the face-to-face interaction.

BRIEF SUMMARY

As noted above, brick-and-mortar business locations provide specialized services that may not be available via e-commerce, or may be preferred by customers over an online experience due to personal preference. Whatever the reason, maintaining brick-and-mortar locations remains an important part of providing services to customers for many industries.

To keep pace with online transactions, face-to-face interactions frequently involve additional interactions based on online accounts, websites, or other e-commerce notions. For example, a customer at a grocery store may need to authorize the use of their subscription service, which was purchased online, to receive benefits when shopping at a brick-and-mortar grocery store.

For these reasons, physical environments, such as bank branches, may require users to authenticate themselves and/or verify their identity prior to performing certain actions (e.g., entering the facility, during check in, before certain services may be performed, etc.). This authentication process may require the user to perform specific actions (e.g., showing a driver's license to an institution employee, inputting information into an institution terminal, etc.). Furthermore, even after users have authenticated themselves, users may still be asked to repeatedly re-authorize the institution to act on their behalf (e.g., repeatedly initial/sign forms), which degrades the user experience.

In contrast to existing approaches, example embodiments presented herein provide systems and methods that automatically authenticate users prior to user entering a physical environment (e.g., a bank branch) by leveraging known information about the user and by using information provided via user devices and/or facility devices. Furthermore, once authenticated, example embodiments may allow the user to automatically authorize and re-authorize certain actions to be taken by the institution.

Example embodiments for authenticating users for a physical environment (e.g., a bank branch or other brick-and-mortar location) may leverage nearby devices (e.g., user devices, facility devices, etc.) to authenticate the user prior to the user being required to authenticate themselves. Example embodiments may receive user identification features from the user device such as biometric information, behavioral biometric information (e.g., gait analysis, device interaction analysis such as swipe pattern, angle the phone is held, etc.), voiceprint, etc. Example embodiments may use a backend engine to generate, based on the received user identification features, a user identification feature confidence score indicative of the confidence of the system in the user's identity. If the user identification feature confidence score for the user satisfies a pre-defined number of authentication thresholds, example embodiments may automatically authenticate the user such that the user does not have to provide additional information or is only required to provide a limited amount of information to authenticate. If the user identification feature confidence score does not satisfy the pre-defined number of authentication thresholds, example embodiments may proactively request additional user identification information from the user device and/or may use facility devices to capture additional information. Example embodiments may then iteratively update the confidence score for the user in real-time.

Once the user has been authenticated, the example embodiments may send a user-specific pre-stage event notification to the user device indicating the system has successfully identified and authenticated the user and provide additional information, for example instructions for where to proceed or an estimated wait time.

In one example embodiment, the techniques described herein relate to a method for providing a user authentication determination pertaining to a first user. The method includes receiving, by communications hardware, one or more user identification indications, where the one or more user identification indications pertain to the first user; determining, by proximity detection circuitry, a user proximity detection alert based on the one or more user identification indications; determining, by user identification circuitry, one or more user identification feature confidence scores based on the one or more user identification indications and one or more user profile features associated with the first user; determining, by user objective analysis circuitry, one or more authentication requirements required for the first user for each of one or more inferred user visit reasons determined for the first user; performing, by user authentication circuitry, one or more user authentication determinations based on the one or more user identification feature confidence scores and the one or more authentication requirements; and providing, by the communications hardware, a user information report, where the user information report includes the one or more user authentication determinations.

In another example embodiment, the techniques described herein relate to an apparatus for providing a user authentication determination pertaining to a first user. The apparatus includes communications hardware configured to receive one or more user identification indications, where the one or more user identification indications pertain to the first user; proximity detection circuitry configured to determine a user proximity detection alert based on the one or more user identification indications; user identification circuitry configured to determine one or more user identification feature confidence scores based on the one or more user identification indications and one or more user profile features associated with the first user; user objective analysis circuitry configured to determine one or more authentication requirements required for the first user for each of one or more inferred user visit reasons determined for the first user; and user authentication circuitry configured to perform one or more user authentication determinations based on the one or more user identification feature confidence scores and the one or more authentication requirements, where the communications hardware is further configured to provide a user information report, where the user information report includes the one or more user authentication determinations.

In another example embodiment, the techniques described herein relate to a computer program product for providing a user authentication determination pertaining to a first user. The computer program product includes at least one non-transitory computer-readable storage medium storing software instructions that, when executed, cause an apparatus to receive one or more user identification indications, where the one or more user identification indications pertain to the first user; determine a user proximity detection alert based on the one or more user identification indications; determine one or more user identification feature confidence scores based on the one or more user identification indications and one or more user profile features associated with the first user; determine one or more authentication requirements required for the first user for each of one or more inferred user visit reasons determined for the first user; perform one or more user authentication determinations based on the one or more user identification feature confidence scores and the one or more authentication requirements; and provide a user information report, where the user information report includes the one or more user authentication determinations.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
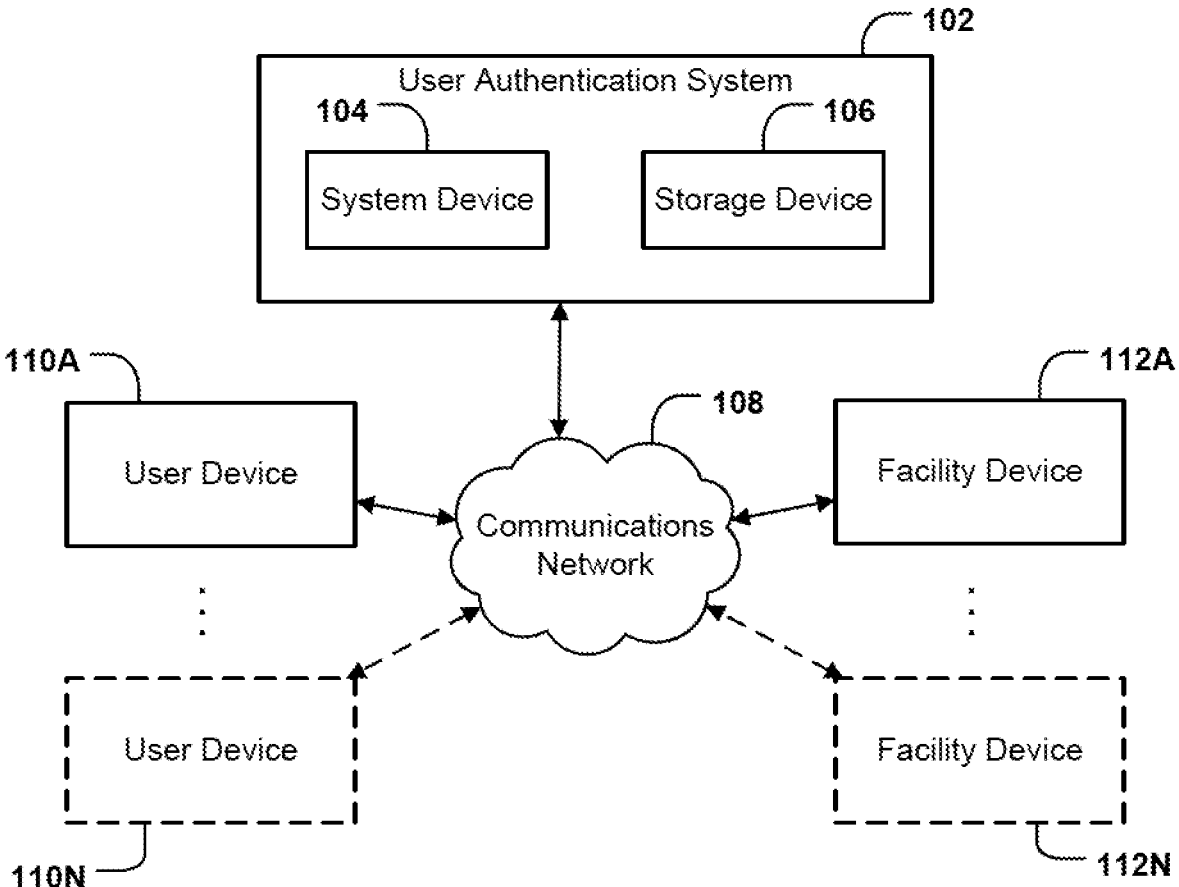
FIG. 1 illustrates a system in which some example embodiments may be used to provide a user authentication determination.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "user identification indication" may refer to a data construct configured to describe data related to a particular user. A user identification indication may include a variety of data types that may be used to identify a user. User identification indications may describe attributes, characteristics, or other identifying features of a user and may include one or more of biometric data, image data, audio data, or user device data. For example, a user identification indication may describe a user identification number, user credential information (e.g., user login and/or password), image data, audio data, and/or the like. In some embodiments, the user identification indications may describe captured user biometric data such as an audio voice snippet, a captured fingerprint scan, retina scan, or facial scan, gait pattern data, device interaction data (e.g., swiping or typing patterns), and/or the like. A user identification indication may be associated with a particular format type. For example, a user identification indication may be associated with an image (e.g., JPEG, PNG, TIFF, RAW, etc.), a video (e.g., MP4, MPEG, MOV, AVI, etc.), text, and/or the like. In some embodiments, the format type for a user identification indication may be determined based on the associated file extension of the user identification indication. In some embodiments, a user identification indication may be unique to the particular user, such as in the case of a user identification number or login name. Additionally or alternatively, a user identification indication may provide a degree of probability of identifying a user, such as a still image captured from a camera where the image of the user is partially obscured. In some embodiments, a plurality of user identification indications may be considered together when attempting to identify the user in order to increase a confidence in the user's identity.

The term "extraction model" may refer to a data construct that is configured to describe parameters, hyper-parameters, and/or stored operations of a model that is configured to process one or more user identification indications to generate one or more captured user features. Captured user features may be extracted from data observed by biometric sensors, video cameras, still image cameras, microphones, detected by data related to connected network devices, such as a media access control (MAC) address, or any other data pertaining to a user. Each captured user feature may be determined to correspond to a particular user feature type and/or user feature sub-type. A user feature type may describe a category to which a capture user feature pertains. For example, a user feature type may be a user credential feature type, a biometric feature type, a device feature type, an association type and/or the like. A user feature sub-type may describe a sub-category of a particular user feature type. For example, for biometric feature type, user feature sub-types may include a user voice user feature sub-type, a fingerprint user feature sub-type, retina user feature sub-type, facial user feature sub-type, gait pattern user feature sub-type, device interaction user feature sub-type, and/or the like. In some embodiments, the extraction model may be a trained classifier model that is configured to process the user identification indications, determine a user feature type and/or user feature sub-type, generate one or more captured user features, and provide the one or more captured user features to the appropriate user feature confidence determination model. The captured user features may also include any associated metadata from the corresponding user identification indication, such as a timestamp, location, transmitting device, etc. In some embodiments, the extraction model may be a neural network, such as a convolutional neural network (CNN), feedforward artificial neural network (ANN), multilayer perceptron (MLP), attention-based models, etc. In some embodiments, the extraction model is a classification machine learning model (e.g., random forest, etc.). In some embodiments, the user identification circuitry 210 may utilize the one or more extraction models for extracting captured user features from image or video data, (e.g., object detection models, video tracking, motion estimation, etc.). In some embodiments, an extraction model may be configured to and/or trained for particular user identification indication format types. For example, an extraction model which is a CNN may be trained and configured to process user identification indications which are associated with a video and/or image format type while another extraction model may be a classification model trained and configured to process user identification indications which are associated with a text format type. In some embodiments, images and/or videos which are processed may also be prepared for further analysis, which as by cropping the images to remove background from the face, then aligned to correct for the angle of the image, lighting, or other factors. In some embodiments, the captured user features may be output and/or formatted with the extracted values as a list, vector, array, and/or the like.

The term "user feature confidence determination model" may refer to a data construct that is configured to describe parameters, hyper-parameters, and/or stored operations of a machine learning model to process one or more captured user features to generate one or more user identification feature confidence scores. The user feature confidence determination model may be a trained machine learning model, such as a neural network. Alternatively, the user feature confidence determination model may be a rules-based model (e.g., a tree-based model) configured to follow a defined set of rules and/or operations to determine a user identification feature confidence score. In some embodiments, the user feature confidence determination model is associated with a particular user feature type such that it is configured to process particular captured user features which are associated with the same user feature type. A user identification feature confidence score may be associated with a particular user identification feature and describe a numerical value that provides a determined measure of confidence provided by the corresponding user identification feature that may be used for verifying the identity of the user for authentication purposes. The user feature confidence determination model may be configured to determine a user identification feature confidence score for a captured user feature based on comparison of the values described by the captured user feature to one or more corresponding values for stored user features stored in a user profile, which may be previously stored data from the user that allow various systems to authenticate the user (such as data from or derived from biometrics, images, audio, user device data, passwords, or the like). In some embodiments, the one or more user identification feature confidence scores may be output and/or formatted as a list, vector, array, and/or the like.

In some embodiments, the user feature confidence determination model may determine whether a value of a captured user feature is an exact match to a stored user feature such that the user identification feature confidence score for the captured user feature is binary (e.g., match/non-match, 0/1, etc.). In some embodiments, the user feature confidence determination model may employ any suitable algorithm to process the captured user features (e.g., principal component analysis, linear discriminant analysis, etc.), such as for biometric analyses. In some embodiments, the user feature confidence determination model may employ any suitable clustering algorithms including but not limited to affinity propagation, agglomerative clustering, balanced iterative reducing and clustering using hierarchies (BIRCH), density-based spatial clustering of applications with noise (DB-SCAN), k-means, mini-batch k-means, mean shift, ordering points to identify cluster structure (OPTICS), spectral clustering, mixture of Gaussians, and/or the like. In some embodiments, the user feature confidence determination model may cluster one or more captured user features with one or more stored user features. In some embodiments, the user identification feature confidence score may be determined based on an inter-cluster distance between two or more clusters for a particular captured user feature.

The term "user activity data" may refer to a data construct that is configured to describe data related to a particular user. In some embodiments, user activity data may include one or more of user browsing history, user location data history, user interactions with application prompts, or historical user data. User activity data may be directly collected from various applications or sites that may share data with the system, or may be obtained from shared info from a third party, accessed on a storage device either locally from or on a remote server. User activity may be usable for deriving information about a user's preferences for shopping, banking, or other activities relevant to the system, and may be analyzed to infer purposes of a user's visit. For example, a user may communicate via social media that they have received a check in the mail, and plan to cash the check soon. This activity may generate user activity data, which may be a derived form of the raw data from the social media interaction. This example user activity data may allow the system to infer the user's likely reasons for a visit to a bank.

The term "user behavior model" may refer to a data construct that is configured to describe parameters, hyper-parameters, and/or stored operations of a machine learning model that is configured to process user activity data to determine one or more inferred user visit reasons and determine one or more authentication requirements. In some embodiments, the user behavior model is a trained machine learning classification model that is trained to analyze and classify data and/or datasets of user activity data. In some embodiments, the user behavior model may only process user activity data determined to occur within a particular time frame. For example, only user activity data (e.g., browsing history, user location data history, user interactions with application prompts) that occurred within the past 6 months processed for a user. The user behavior model may be trained on past user interactions for the particular user, for example labelling user activity data with actual user visit reasons from past visits. In some embodiments, the user behavior model may use geographic data and/or demographic data for users when determining one or more inferred user visit reasons for a particular user.

In some embodiments, the user behavior model may include a set of rules and/or stored operations for each inferred user visit reason. An inferred user visit reason may be associated with one or more authentication requirements that the user must satisfy in order to be successfully authenticated. In some embodiments, the one or more authentication requirements include describing one or more required user feature types and/or user feature sub-types as well as one or more authentication threshold values for the user feature types and/or user feature sub-types for the corresponding inferred user visit reason. An authentication threshold value may be associated with a user feature type and/or user feature sub-type and describe a numerical value that is indicative of user identification feature confidence score for that user feature type and/or user feature sub-type required to make a determination of successful authentication. Otherwise, the user may not be successfully authenticated. In some embodiments, an inferred user visit reason may have multiple options for successful authentication. In some embodiments, the one or more authentication requirements may be output and/or formatted as a list, vector, array, and/or the like.

The term "authentication model" may refer to a data construct that is configured to describe parameters, hyper-parameters, and/or stored operations of a model that is configured to process one or more authentication requirements and perform one or more authentication determinations to determine whether the user is successfully authenticated. In some embodiments, the authentication model may be a rules-based model (e.g., a tree-based model) configured to determine whether the one or more user identification feature confidence scores and/or captured user features satisfy the one or more authentication requirements for the inferred user visit reason. The authentication model may compare the user identification feature confidence scores, each associated with a captured user feature of a user feature type and/or user feature sub-type, to the one or more authentication requirements to determine whether the user is successfully authenticated. In some embodiments, in an instance multiple inferred user visit reasons are determined, the authentication model may be configured to abide by the strictest authentication requirements. In an instance the user is not successfully authenticated, a determination of unsuccessful authentication may be made. Depending on the configuration of the system, once an unsuccessful authentication is determined, the entire authentication may be determined to fail. Alternatively, in some embodiments, the authentication model may generate and provide one or more additional authentication requests to one or more user devices and/or facility devices. The one or more additional authentication requests may describe a request for one or more additional captured user features for the user, which may be determined based on the authentication requirements and the current captured user feature and associated user identification feature confidence scores. The authentication model may output an indication of a user authentication status, such as by generating a user information report.

The term "user information report" may refer to a data construct configured to describe a summary of the user authentication process. In particular, the user information report may include the one or more user authentication determinations (e.g., authenticated or not authenticated), the one or more inferred user visit reasons, and/or any additional information gathered by the system that may be needed for user authorization to access needed services (e.g., as determined via the inferred user visit reasons). The user information report may be provided in both a human-readable format, for example, to present to agents at a brick-and-mortar bank branch, as well as in a computer-readable format to be provided to additional circuitry or systems that may make an authorization determination. The user information report may further include authentication threshold values, user identification indications, and/or user identification feature confidence scores for the user.

System Architecture

Example embodiments described herein may be implemented using any of a variety of computing devices or servers. To this end, FIG. 1 illustrates an example environment within which various embodiments may operate. As illustrated, a user authentication system 102 may include a system device 104 in communication with a storage device 106. Although system device 104 and storage device 106 are described in singular form, some embodiments may utilize more than one system device 104 and/or more than one storage device 106. Additionally, some embodiments of the user authentication system 102 may not require a storage device 106 at all. Whatever the implementation, the user authentication system 102, and its constituent system device(s) 104 and/or storage device (s) 106 may receive and/or transmit information via communications network 108 (e.g., the Internet) with any number of other devices, such as one or more of user devices 110A-110N and/or facility devices 112A-112N.

System device 104 may be implemented as one or more servers, which may or may not be physically proximate to other components of user authentication system 102. Furthermore, some components of system device 104 may be physically proximate to the other components of user authentication system 102 while other components are not. System device 104 may receive, process, generate, and transmit data, signals, and electronic information to facilitate the operations of the user authentication system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the user authentication system 102. Storage device 106 may store information relied upon during operation of the user authentication system 102, such as various user profile data that may be used by the user authentication system 102, data and documents to be analyzed using the user authentication system 102, or the like. In addition, storage device 106 may store control signals, device characteristics, and access credentials enabling interaction between the user authentication system 102 and one or more of the user devices 110A-110N or facility devices 112A-112N.

The one or more user devices 110A-110N may be any portable computing device such as laptop computers, tablet computers, smart books, palm-top computers, personal computers, smartphones, PDAs, wearable devices (such as headsets, smartwatches, or the like), and similar electronic devices. The one or more user devices 110A-110N may connect to the user authentication system 102 via the communications network 108 (e.g., a local area network or the Internet). In some embodiments, may be configured to perform various actions at the request of the user authentication system 102 via pre-installed software instructions.

The one or more facility devices 112A-112N may be any devices of a variety of cameras, detectors, biometric sensors, network devices, or computing devices communicatively coupled to any of the devices listed here. The one or more facility devices 112A-112N may communicate with the user authentication system 102 via the communications network 108 (e.g., a local area network or the Internet). The one or more facility devices 112A-112N may be configured to automatically capture one or more user identification indications through the various sensors and other input devices included in the facility devices 112A-112N. In some embodiments, the facility devices 112A-112N may perform processing steps on the captured user identification indications, for example by cropping or filtering image data to be used for facial recognition. In some embodiments, the raw data collected by the facility devices 112A-112N may be passed to the user authentication system 102 where processing is performed by the system device 104.

Although FIG. 1 illustrates an environment and implementation in which the user authentication system 102 interacts with one or more of user device 110A through user device 110N and/or facility device 112A through facility device 112N, in some embodiments users may directly interact with the user authentication system 102 (e.g., via input/output circuitry of system device 104), in which case a separate facility device 112 may not be utilized. Whether by way of direct interaction or via a separate facility device 112, a user may communicate with, operate, control, modify, or otherwise interact with the user authentication system 102 to perform the various functions and achieve the various benefits described herein.

Example Implementing Apparatuses

Figure 2:
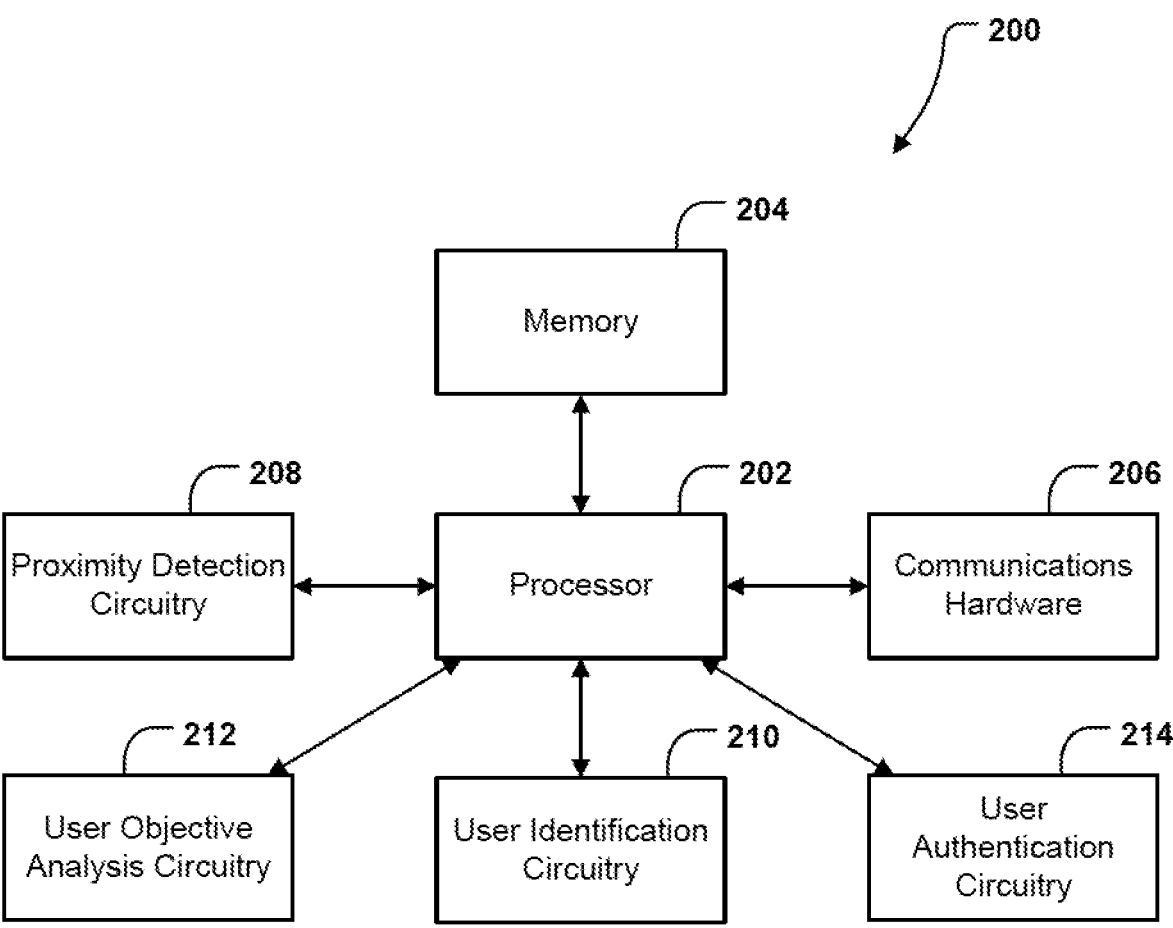
FIG. 2 illustrates a schematic block diagram of example circuitry embodying a system device that may perform various operations in accordance with some example embodiments described herein.

System device 104 of the user authentication system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, proximity detection circuitry 208, user identification circuitry 210, user objective analysis circuitry 212, and user authentication circuitry 214, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 4-8.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. In some embodiments, the communications hardware 206 may be configured to receive and/or provide one or more user identification indications, user activity data, one or more additional authentication requests, one or more additional user identification indications, an action notification, and/or a user information report. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a proximity detection circuitry 208 that may be configured to determine a user proximity detection alert. The proximity detection circuitry 208 may utilize processor 202, memory 204, or any other hardware component included in the apparatus 200 to perform these operations, as described in connection with FIGS. 4-8 below. The proximity detection circuitry 208 may further utilize communications hardware 206 to gather data from a variety of sources (e.g., facility device 112A through facility device 112N or storage device 106, as shown in FIG. 1), and/or exchange data with a user, and in some embodiments may utilize processor 202 and/or memory 204 to determine the proximity detection alert.

In addition, the apparatus 200 further comprises a user identification circuitry 210 that is configured to determine user identification feature scores. In some embodiments, the user identification circuitry 210 may further be configured to determine one or more captured user features and/or access one or more user profile features. The user identification circuitry 210 may utilize processor 202, memory 204, or any other hardware component included in the apparatus 200 to perform these operations, as described in connection with FIGS. 4-8 below. The user identification circuitry 210 may further utilize communications hardware 206 to gather data from a variety of sources (e.g., user device 110A through user device 110N, facility device 112A through facility device 112N, or storage device 106, as shown in FIG. 1), and/or exchange data with a user, and in some embodiments may utilize processor 202 and/or memory 204 to determine user identification feature scores. The user identification circuitry 210 may additionally make use of one or more extraction models and/or user feature confidence determination models, which may be stored by and/or accessed from storage device 106 and/or a remote storage device.

In addition, the apparatus 200 further comprises a user objective analysis circuitry 212 that is configured to determine one or more inferred user visit reasons and/or one or more authentication requirements for the user. In some embodiments, the user objective analysis circuitry 212 may further be configured to determine a user behavior pattern for a user. The user objective analysis circuitry 212 may utilize processor 202, memory 204, or any other hardware component included in the apparatus 200 to perform these operations, as described in connection with FIGS. 4-8 below. The user identification circuitry 210 may further utilize communications hardware 206 to gather data from a variety of sources (e.g., user device 110A through user device 110N, facility device 112A through facility device 112N, or storage device 106, as shown in FIG. 1), and/or exchange data with a user, and in some embodiments may utilize processor 202 and/or memory 204 to determine authentication threshold values. The user identification circuitry 210 may additionally make use of one or more user behavior models, which may be stored by and/or accessed from storage device 106 and/or a remote storage device.

In addition, the apparatus 200 further comprises a user authentication circuitry 214 that is configured to performs one or more user authentication determinations. The user identification circuitry 210 may utilize processor 202, memory 204, or any other hardware component included in the apparatus 200 to perform these operations, as described in connection with FIGS. 4-8 below. The user authentication circuitry 214 may further utilize communications hardware 206 to gather data from a variety of sources (e.g., user device 110A through user device 110N, facility device 112A through facility device 112N, or storage device 106, as shown in FIG. 1), and/or exchange data with a user, and in some embodiments may utilize processor 202 and/or memory 204 to perform user authentication determinations. The user authentication circuitry 214 may additionally make use of one or more authentication models, which may be stored by and/or accessed from storage device 106 and/or a remote storage device.

Although components 202-214 are described in part using functional language, it will be understood that the particular implementations necessarily include the use of particular hardware. It should also be understood that certain of these components 202-214 may include similar or common hardware. For example, the proximity detection circuitry 208, user identification circuitry 210, user objective analysis circuitry 212, and user authentication circuitry 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry," with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the proximity detection circuitry 208, user identification circuitry 210, user objective analysis circuitry 212, and user authentication circuitry 214 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the proximity detection circuitry 208, user identification circuitry 210, user objective analysis circuitry 212, and user authentication circuitry 214 are implemented via particular machinery designed for performing the functions described herein in connection with such elements of apparatus 200.

Figure 3:
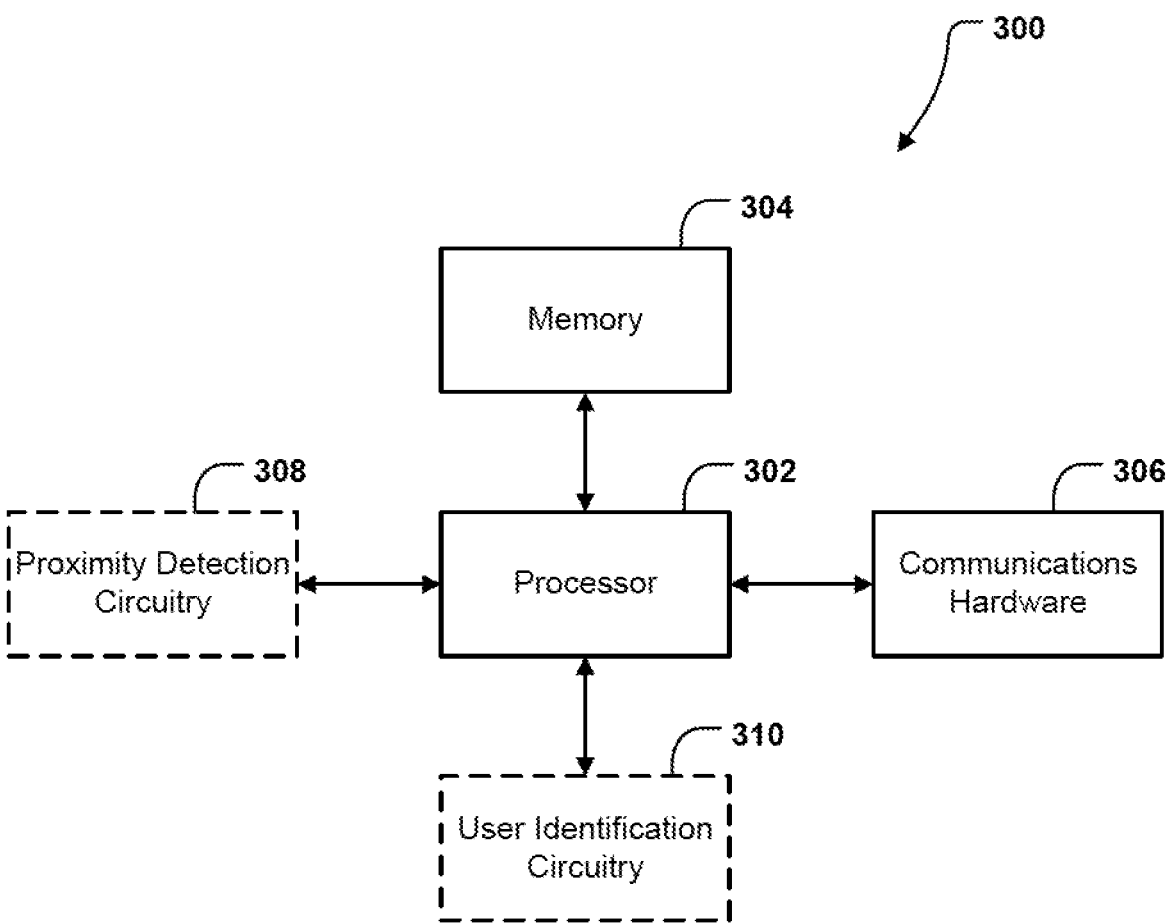
FIG. 3 illustrates a schematic block diagram of example circuitry embodying a facility device and/or user device that may perform various operations in accordance with some example embodiments described herein.

As illustrated in FIG. 3, an apparatus 300 is shown that represents an example facility device 112A-112N (e.g., any of facility device 112A through 112N) or an example user device 110A-110N (e.g., any of user device 110A through user device 110N). The apparatus 300 includes processor 302, memory 304, communications hardware 306, and may optionally include proximity detection circuitry 308 and user identification circuitry 310, each of which is configured to be similar to the similarly named components described above in connection with FIG. 2.

In some embodiments, various components of the apparatuses 200 and 300 may be hosted remotely (e.g., by one or more cloud servers) and thus need not physically reside on the corresponding apparatus 200 or 300. Thus, some or all of the functionality described herein may be provided by third party circuitry. For example, a given apparatus 200 or 300 may access one or more third party circuitries via any sort of networked connection that facilitates transmission of data and electronic information between the apparatus 200 or 300 and the third-party circuitries. In turn, that apparatus 200 or 300 may be in remote communication with one or more of the other components describe above as comprising the apparatus 200 or 300.

As will be appreciated based on this disclosure, example embodiments contemplated herein may be implemented by an apparatus 200 or 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatuses 200 and 300, example embodiments are described below in connection with a series of flowcharts.

Example Operations

Turning to FIGS. 4-8, example flowcharts are illustrated that contain example operations implemented by example embodiments described herein. The operations illustrated in FIGS. 4-8 may, for example, be performed by system device 104 of the user authentication system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, proximity detection circuitry 208, user identification circuitry 210, user objective analysis circuitry 212, user authentication circuitry 214, and/or any combination thereof. It will be understood that user interaction with the user authentication system 102 may occur directly via communications hardware 206, or may instead be facilitated by a separate user device 110 and/or facility device 112, as shown in FIG. 1, and which may have similar or equivalent physical componentry facilitating such user interaction.

In some embodiments, a portion of the operations illustrated in FIGS. 4-8 may, for example, be performed by any one of the facility devices 112A-112N and/or user devices 110A-110N shown in FIG. 1, which may in turn be embodied by an apparatus 300, which is shown and described in connection with FIG. 3. Similarly, in order to perform the operations described below, the apparatus 300 may utilize one or more of processor 302, memory 304, communications hardware 306, proximity detection circuitry 308, user identification circuitry 310, and/or any combination thereof.

Figure 4:
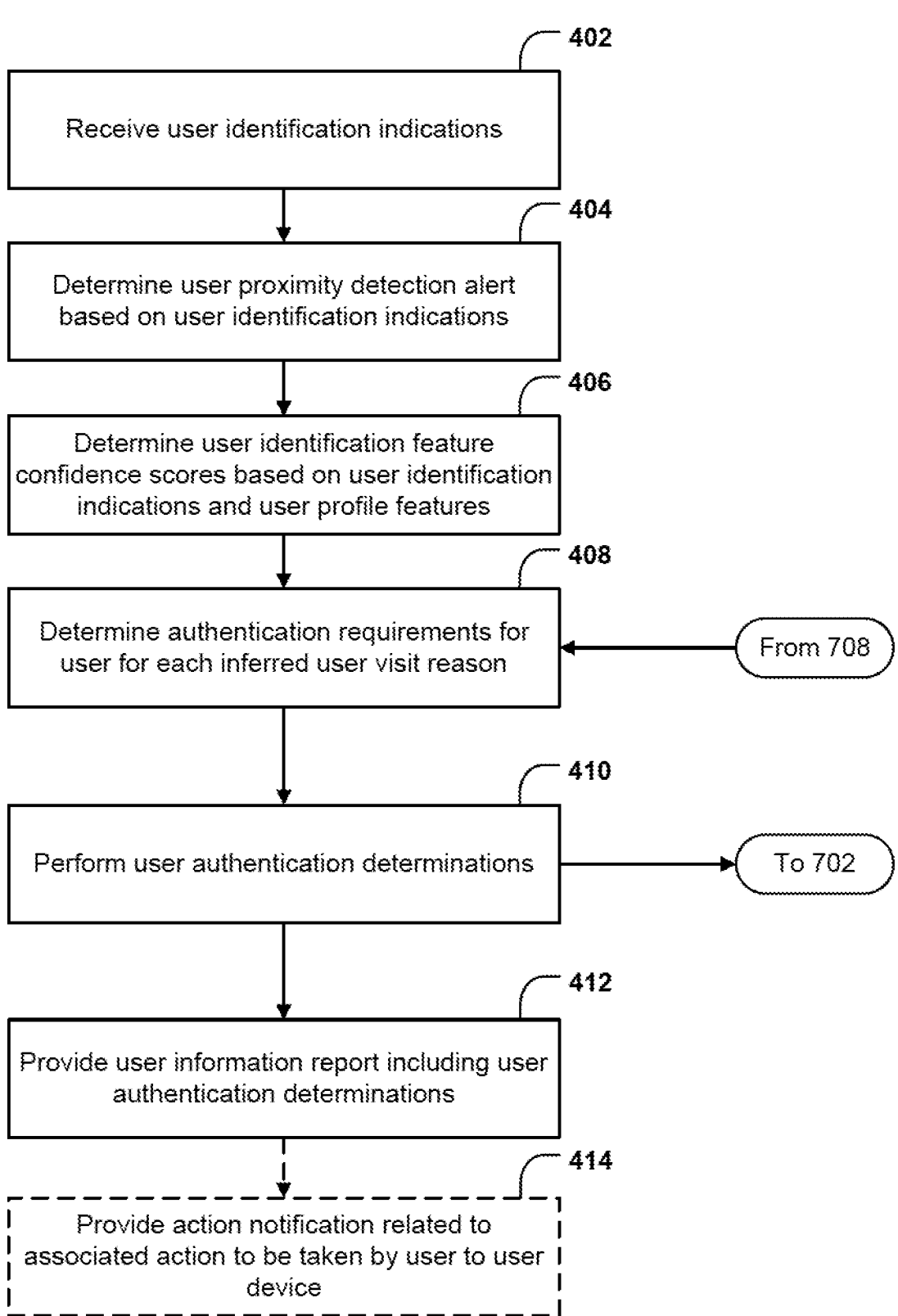
FIG. 4 illustrates an example flowchart for providing a user authentication determination pertaining to a first user, in accordance with some example embodiments described herein.

Turning first to FIG. 4, example operations are shown for providing a user authentication determination pertaining to a first user. As shown by operation 402, the apparatus 200 includes means, such as memory 204, communications hardware 206, or the like, for receiving one or more user identification indications, wherein the one or more user identification indications pertain to a first user. A user identification indication may include a variety of data types that may be used to identify a user. User identification indications may describe attributes, characteristics, or other identifying features of a user and may include one or more of biometric data, image data, audio data, or user device data. For example, a user identification indication may describe a user identification number, user credential information (e.g., user login and/or password), image data, audio data, and/or the like. In some embodiments, the user identification indications may describe captured user biometric data such as an audio voice snippet, a captured fingerprint scan, retina scan, or facial scan, gait pattern data, device interaction data (e.g., swiping or typing patterns), and/or the like.

A user identification indication may be associated with a particular format type. For example, a user identification indication may be associated with an image (e.g., JPEG, PNG, TIFF, RAW, etc.), a video (e.g., MP4, MPEG, MOV, AVI, etc.), text, and/or the like. In some embodiments, the format type for a user identification indication may be determined based on the associated file extension of the user identification indication. In some embodiments, a user identification indication may be unique to the particular user, such as in the case of a user identification number or login name. Additionally or alternatively, a user identification indication may provide a degree of probability of identifying a user, such as a still image captured from a camera where the image of the user is partially obscured. In some embodiments, a plurality of user identification indications may be considered together when attempting to identify the user in order to increase a confidence in the user's identity.

The user identification indications may have previously been stored in a storage device 106 as set forth in FIG. 1, which may comprise memory 204 of the apparatus 200 or a remote storage device 106 accessible by the apparatus 200 using communications hardware 206 or the like. In such cases, the user identification indications may be retrieved by the apparatus 200 unilaterally. However, the user identification indication may be received from a separate device with which a user interacts (e.g., one of user device 110A through user device 110N or facility device 112A through facility device 112N), in which case the user identification indications may be received via communications hardware 206. If the user interacts directly with the apparatus 200, the user identification indications may be received via attached input devices of the communications hardware 206.

In some embodiments, the one or more user identification indications are received from one or more facility devices 112A through 112N or a user device 110A through user device 110N of the first user. In some embodiments, a user device 110A through 110N may provide one or more user identification indications to a facility device 112A through 112N, which may then provide the one or more user identification indications to the apparatus 200. The facility devices 112A through 112N may be cameras, wireless network devices, biometric sensors, microphones, or the like, or may include such devices attached as peripherals to computer systems. For example, at a brick-and-mortar bank branch, facility devices may include security cameras around the building, biometric sensors located in the building lobby, a high-definition camera near the front door of the building, traffic cameras and motion detectors to detect vehicles in the parking lot, microphones located at customer service stations, and network devices designed to detect a user's phone or other device in proximity to the building's wireless network. User devices may include any portable computing device such as laptop computers, tablet computers, smart books, palm-top computers, personal computers, smartphones, PDAs, wearable devices (such as headsets, smartwatches, or the like), and similar electronic devices.

As shown by operation 404, the apparatus 200 includes means, such as processor 202, memory 204, communications hardware 206, proximity detection circuitry 208, or the like, for determining a user proximity detection alert based on the one or more user identification indications. To this end, the proximity detection circuitry 208 of apparatus 200 may analyze one or more received user identification indications received in operation 402 to determine a user proximity detection alert. A user proximity detection alert may be triggered by one or more particular actions described by the received user identification indications and may indicate that a user is within proximity of the brick-and-mortar facility and is likely to visit the facility. For example, a user proximity alert may be triggered in response to user identification indications which describe a detection that a user's MAC address from their cellphone has been detected on the apparatus network, a user's car license plate has been captured pulling into the parking lot of the facility, a user's face has been detected by a camera outside and/or inside the facility, and/or the like. The user proximity detect alert may thus be indicative that a user is visiting the facility and trigger subsequent actions to provide a user authentication determination for the detected user. As such, the apparatus 200 may conserve computational resources by only further processing user identification indications in an instance a user proximity detection alert is determined.

In some embodiments, certain objects and/or users may be exempt from triggering a user proximity detection alert. For example, if the license plate, face, or user device of a facility employee is captured in the received user identification indications, then no user proximity detection alert is determined. In some embodiments, a set of exempt objects may be stored (e.g., by memory 204, storage device 106, or a remote storage) which describes certain objects and/or users which are exempt from triggering the user proximity detection alert for one or more particular facility locations (e.g., locations where the user is an employee). Apparatus 200 and/or facility devices 112A-112N may access a stored set of exempt objects to determine whether a detected or captured user described by a user identification indication is exempt.

In some embodiments, apparatus 200 may determine a user proximity detection alert in response to receiving a user proximity detection alert from a facility device 112A-112N, which may be configured to internally process data, provide user identification indications, and a user proximity detection alert. For example, a facility device 112A may be a camera positioned outside the facility such that the camera may capture license plates of cars and/or user faces. The facility device 112A may thus process the captured images to determine whether a license plate and/or human face is captured in the image. In the instance a license plate and/or human face is captured, the apparatus 200 may receive the user proximity detection alert from the facility device 112A and thus determines a user proximity detection alert.

As shown by operation 406, the apparatus 200 includes means, such as processor 202, memory 204, communications hardware 206, user identification circuitry 210, or the like, for determining one or more user identification feature confidence scores based on the one or more user identification indications and one or more user profile features associated with the first user. A user identification feature confidence score may be associated with a particular user identification feature and describe a numerical value that provides a determined measure of confidence provided by the corresponding user identification feature that may be used for verifying the identity of the user for authentication purposes. In some embodiments, the user identification circuitry 210 may use one or more extraction models and/or one or more user feature confidence determinations models to determine the one or more user identification feature confidence scores.

Figure 5:
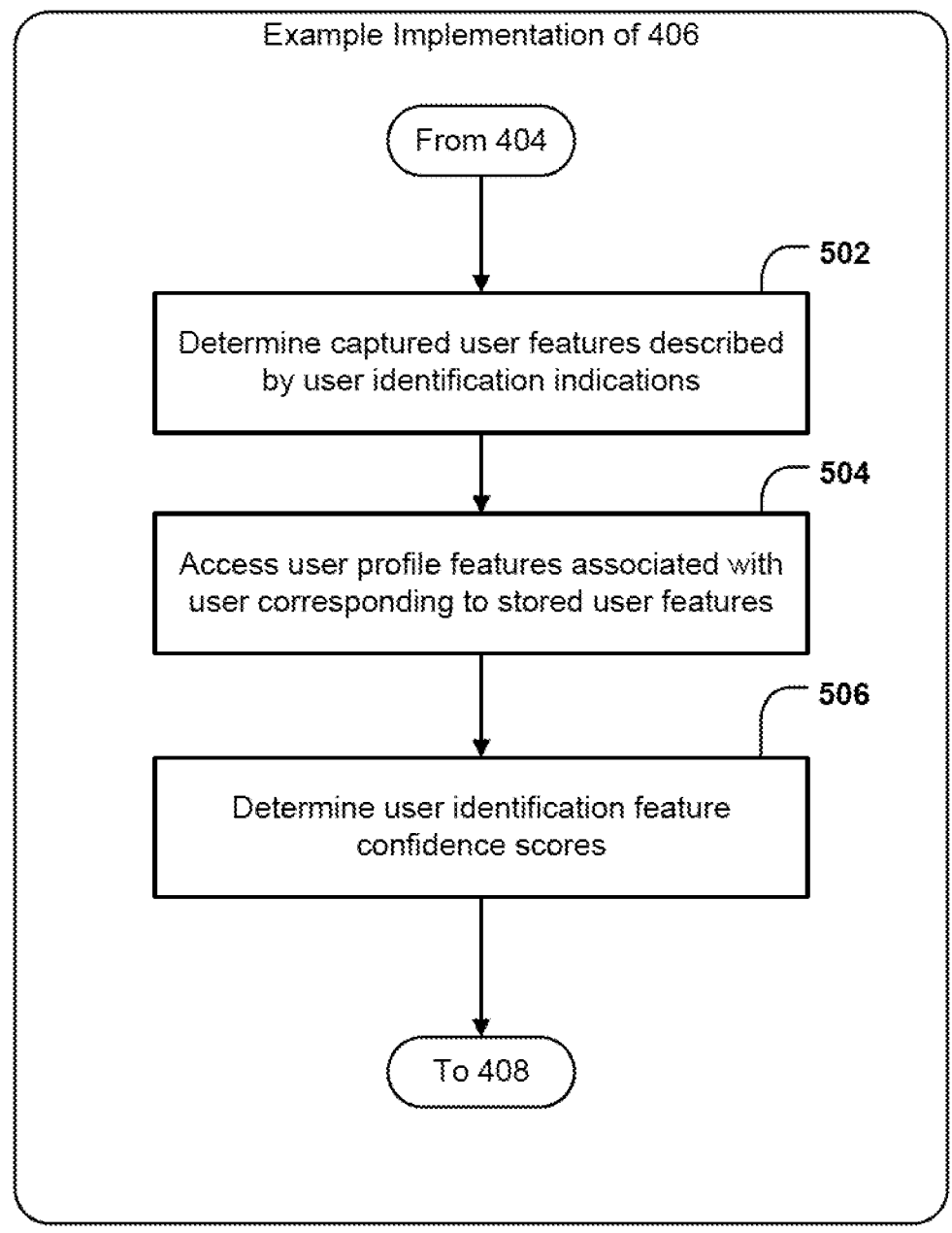
FIG. 5 illustrates an example flowchart for determining user identification feature confidence scores, in accordance with some example embodiments described herein.

In some embodiments, operation 406 may be performed in accordance with the operations described by FIG. 5. Turning next to FIG. 5, example operations are shown for determining the one or more user identification feature confidence scores.

As shown by operation 502, the apparatus 200 includes means, such as processor 202, memory 204, communications hardware 206, user identification circuitry 210, or the like, for determining one or more captured user features described by the one or more user identification indications. In some embodiments, the user identification circuitry 210 may use one or more extraction models to determine one or more capturer user features. A captured user feature may describe data by the user identification indication and that may be used to identify a user. For example, a user identification indication may describe a captured image which depicts a user while captured user feature may describe values for a user's face, retina, license plate number, etc. Captured user features may be extracted from data observed by biometric sensors, video cameras, still image cameras, microphones, detected by data related to connected network devices, such as a MAC address, or any other data pertaining to a user. In some embodiments, captured user feature data may not be stored after capture for privacy and/or security reasons.

Each captured user feature may be determined to correspond to a particular user feature type and/or user feature sub-type. A user feature type may describe a category to which a capture user feature pertains. For example, a user feature type may be a user credential feature type, a biometric feature type, a device feature type, an association type and/or the like. A user feature sub-type may describe a sub-category of a particular user feature type. For example, for biometric feature type, user feature sub-types may include a user voice user feature sub-type, a fingerprint user feature sub-type, retina user feature sub-type, facial user feature sub-type, gait pattern user feature sub-type, device interaction user feature sub-type, and/or the like.

In some embodiments, the extraction model may be a trained classifier model that is configured to process the user identification indications, determine a user feature type and/or user feature sub-type, generate one or more captured user features, and provide the one or more captured user features to an appropriate user feature confidence determination model. The captured user features may also include any associated metadata from the corresponding user identification indication, such as a timestamp, location, transmitting device, etc. In some embodiments, the extraction model may be a neural network (CNN, ANN, MLP, attention-based models, etc.). In some embodiments, the extraction model is a classification machine learning model (e.g., random forest, etc.). In some embodiments, the user identification circuitry 210 may utilize the one or more extraction models for extracting captured user features from image or video data, (e.g., object detection models, video tracking, motion estimation, etc.).

In some embodiments, an extraction model may be configured to and/or trained for particular user identification indication format types. For example, an extraction model which is a CNN may be trained and configured to process user identification indications which are associated with a video and/or image format type while another extraction model may be a classification model trained and configured to process user identification indications which are associated with a text format type. In some embodiments, images and/or videos which are processed may also be prepared for further analysis, which as by cropping the images to remove background from the face, then aligned to correct for the angle of the image, lighting, or other factors. In some embodiments, the captured user features may be output and/or formatted with the extracted values as a list, vector, array, and/or the like.

As shown by operation 504, the apparatus 200 includes means, such as processor 202, memory 204, communications hardware 206, user identification circuitry 210, or the like, for accessing the one or more user profile features associated with the first user which correspond to the one or more captured user features. The one or more user profile features may have previously been stored in a storage device 106 as set forth in FIG. 1, which may comprise memory 204 of the apparatus 200 or a remote storage device 106 accessible by the apparatus 200 using communications hardware 206 or the like. In such cases, the one or more user profile features may be retrieved by the apparatus 200 unilaterally. However, the one or more user profile features may be received from a separate device dedicated to centrally storing user profile information (e.g., one of facility device 112A through facility device 112N), in which case the one or more user profile features may be received via communications hardware 206. The one or more user profile features may be stored on other remote devices, including cloud platforms, dedicated files servers, or the like, in which case the one or more user profile features may also be received via communications hardware 206.

As shown by operation 506, the apparatus 200 includes means, such as processor 202, memory 204, user identification circuitry 210, or the like, for determining the one or more user identification feature confidence scores. In some embodiments, the user identification circuitry may be configured to use one or more user feature confidence determination models to determine the one or more user identification feature confidence scores. The user feature confidence determination models may compare the captured user features received during operation 502 (e.g., from the one or more extraction models) to one or more of the corresponding stored user features (e.g., which match the user feature type and/or user feature sub-type of the captured user feature). In some embodiments, the user feature confidence determination model may be a trained machine learning model, such as a neural network. Alternatively, the user feature confidence determination model may be a rules-based model (e.g., a tree-based model) configured to follow a defined set of rules and/or operations to determine a user identification feature confidence score.

In some embodiments, the user identification circuitry 210 may receive the user identification indications and may receive additional information (e.g., such as during an account setup for a user) from one or more user devices 110A-110N and/or facility devices 112A-112N to compute one or more user identification feature confidence scores. The received user data may be processed and stored in an associated user profile as stored user features such as in memory 204, or stored remotely and may accessed via communications hardware 206. The stored user feature data may thus form the basis for computation of the user identification feature confidence scores.

In some embodiments, the user feature confidence determination model is associated with a particular user feature type such that it is configured to process particular captured user features which are associated with the same user feature type. As described above, a user identification feature confidence score may be associated with a particular user identification feature and describe a numerical value that provides a determined measure of confidence provided by the corresponding user identification feature that may be used for verifying the identity of the user for authentication purposes. The user feature confidence determination model may be configured to determine a user identification feature confidence score for a captured user feature based on comparison of the values described by the captured user feature to one or more corresponding values for stored user features stored in a user profile, which may be previously stored data from the user that allow various systems to authenticate the user (such as data from or derived from biometrics, images, audio, user device data, passwords, or the like). In some embodiments, the one or more user identification feature confidence scores may be output and/or formatted as a list, vector, array, and/or the like.

In some embodiments, the user feature confidence determination model may determine whether a value of a captured user feature is an exact match to a stored user feature such that the user identification feature confidence score for the captured user feature is binary (e.g., match/non-match, 0/1, etc.). In some embodiments, the user feature confidence determination model may employ any suitable algorithm to process the captured user features (e.g., principal component analysis, linear discriminant analysis, etc.), such as for biometric analyses.

In some embodiments, the user feature confidence determination model may employ any suitable clustering algorithms including but not limited to affinity propagation, agglomerative clustering, BIRCH, DBSCAN, k-means, mini-batch k-means, mean shift, OPTICS, spectral clustering, mixture of Gaussians, and/or the like. In some embodiments, the user feature confidence determination model may cluster one or more captured user features with one or more stored user features. In some embodiments, the user identification feature confidence score may be determined based on an inter-cluster distance between two or more clusters for a particular captured user feature. For example, one cluster may correspond to a most recent keystroke pattern received for the user and another cluster may correspond to a historical average keystroke pattern for the user, wherein the historical average keystroke pattern is the averaged keystroke pattern. The user identification feature confidence score may be determined based at least in part on the inter-cluster distance between each of the cluster associated with the current value of the captured user feature and the one or more clusters associated with the one or more stored user features associated with the user profile. Here, the user identification feature confidence score for the captured user feature may be a numerical value that corresponds to a scale. For example, a user identification feature confidence score for a retina user feature sub-type may follow a scale from 0 to 1, where 0 indicates no similarities between the captured user feature and stored user feature and 1 indicates an exact match between the captured user feature and the stored user feature. A captured user feature may be determined to have a user identification feature confidence score of 0.7 in an instance the captured user feature has 7 out of 10 values which match values of the stored user features but 3 values which do not match.

The user identification circuitry 210 may direct input to the one or more user feature confidence determination models by formatting, infilling, or otherwise preparing one or more captured user features and corresponding user profile features from operations 502 and 504. The output response from each feature confidence determination model may then be formatted or otherwise processed to realize a determination or probability of each captured user feature providing a successful authentication, which is converted a user identification feature confidence score.

Returning now to FIG. 4, as shown by operation 408, the apparatus 200 includes means, such as processor 202, memory 204, communications hardware 206, user objective analysis circuitry 212, or the like, for determining one or more authentication requirements for the first user for each of one or more inferred user visit reason. In some embodiments, the one or more authentication requirements include describing one or more required user feature types and/or user feature sub-types as well as one or more authentication threshold values for the user feature types and/or user feature sub-types for the corresponding inferred user visit reason. An authentication threshold value may be associated with a user feature type and/or user feature sub-type and describe a numerical value that is indicative of user identification feature confidence score for that user feature type and/or user feature sub-type required to make a determination of successful authentication. Otherwise, the user may not be successfully authenticated. In some embodiments, an inferred user visit reason may have multiple options for successful authentication. In some embodiments, the user objective analysis circuitry 212 may use one or more user behavior models to determine one or more inferred user visit reasons and the one or more authentication requirements for the first user.

Figure 6:
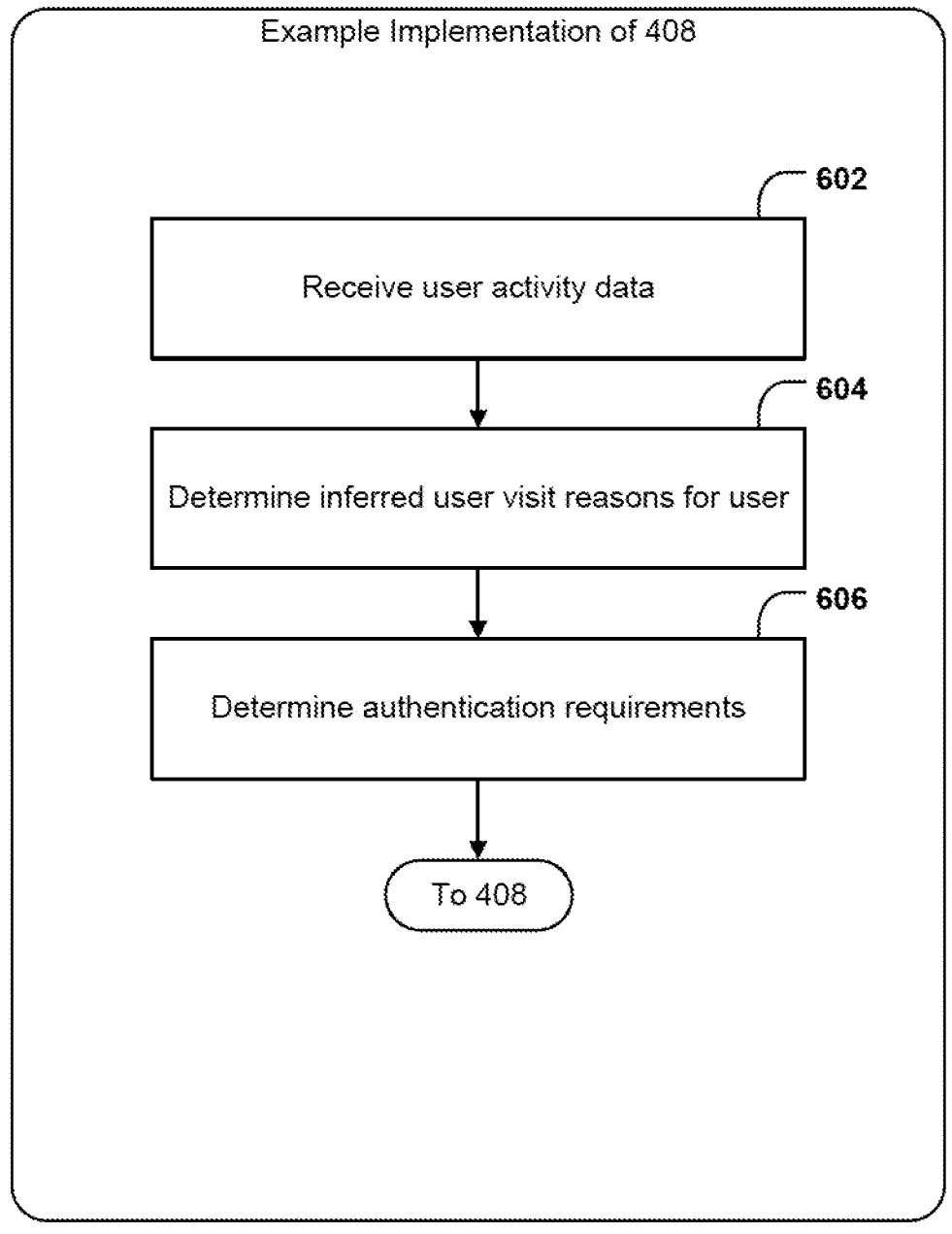
FIG. 6 illustrates an example flowchart for one or more authentication requirements, in accordance with some example embodiments described herein.

In some embodiments, operation 408 may be performed in accordance with the operations described by FIG. 6. Turning now to FIG. 6, example operations are shown for example operations are shown for providing inferred user visit reasons. As shown by operation 602, the apparatus 200 includes means, such as processor 202, memory 204, communications hardware 206, or the like, for receiving user activity data. User activity data may describe data related to a particular user. In some embodiments, user activity data may include one or more of user browsing history, user location data history, user interactions with application prompts, or historical user data. User activity data may be directly collected from various applications or sites that may share data with the system, or may be obtained from shared info from a third party, accessed on a storage device either locally from or on a remote server. User activity may be usable for deriving information about a user's preferences for shopping, banking, or other activities relevant to the system, and may be analyzed to infer purposes of a user's visit. For example, a user may communicate via social media that they have received a check in the mail, and plan to cash the check soon. This activity may generate user activity data, which may be a derived form of the raw data from the social media interaction. This example user activity data may allow the system to infer the user's likely reasons for a visit to a bank. For example, a user may communicate via social media that they have received a check in the mail, and plan to cash the check soon. This activity may generate user activity data, which may be a derived form of the raw data from the social media interaction. This example user activity data may be processed by the user objective analysis circuitry 212 to infer the user's likely reasons for a visit to a bank (e.g., to deposit the received check).

The user activity data may have previously been stored in a storage device 106 as set forth in FIG. 1, which may comprise memory 204 of the apparatus 200 or a remote storage device 106 accessible by the apparatus 200 using communications hardware 206 or the like. In such cases, the user activity data may be retrieved by the apparatus 200 unilaterally. However, the user activity data may be received from a separate device with which a user interacts (e.g., one of user device 110A through user device 110N or facility device 112A through facility device 112N), in which case the user identification indications may be received via communications hardware 206.

As shown by operation 604, the apparatus 200 includes means, such as processor 202, memory 204, user objective analysis circuitry 212, or the like, for determining the one or more inferred user visit reasons. The one or more inferred user visit reasons may describe an inferred reason the user is visiting the facility. The user objective analysis circuitry 212 may use one or more user behavior models to determine the one or more inferred user visit reasons.

In some embodiments, the user behavior model is a trained machine learning classification model that is trained to analyze and classify data and/or datasets of user activity data. In some embodiments, the user behavior model may only process user activity data determined to occur within a particular time frame. For example, only user activity data (e.g., browsing history, user location data history, user interactions with application prompts) that occurred within the past 6 months processed for a user. As such, the user behavior model may only consider recent user activity data to identify a current reason the user might visit a facility.

In some embodiments, the user behavior model may also determine one or more user behavior patterns based on historical user data and use the one or more user behavior patterns to determine one or more inferred user visit reasons. The user behavior model may be trained on past user interactions for the particular user, for example labelling user activity data with actual user visit reasons from past visits. For example, data about a user who visits a location every first Monday of each month to cash a check may be used to infer a user behavior pattern to predict a user's likely activity when visiting on the first Monday of an upcoming month. The user behavior model may also be trained on past user interactions for other users. For example, labelled user activity data from other user with actual user visit reasons from past visits may provide a wider range of training data for the user behavior model. As such, the user behavior model may be configured to determine a user behavior pattern for based on user activity data. In some embodiments, the user behavior model may use geographic data and/or demographic data for users when determining one or more inferred user visit reasons for a particular user.

The one or more user behavior models may analyze the user activity data and/or user behavior patterns to determine or more inferred user visit reasons. The analysis may involve finding matches between (i) various recorded transactions or activities related to potential user visit reasons, and (ii) present conditions, such as time and date, recent transactions or activities, or the like. The analysis may produce one or more likely inferred user visit reasons from the matches found in the user activity data and current conditions.

As shown by operation 606, the apparatus 200 includes means, such as processor 202, memory 204, user objective analysis circuitry 212, or the like, for determining the one or more authentication requirements for the user. The one or more authentication requirements may be determined based on the one or more inferred user visit reasons. In some embodiments, the user objective analysis circuitry 212 may use the one or more user behavior models (e.g., the user behavior models described above in operation 604) to determine the one or more authentication requirements. As such, the authentication requirements for a user may be customized based on a likely user visit reason. For example, if an inferred user visit reason is to cash a check, less rigorous authentication requirements may be needed for the user as compared to an inferred user visit reason of applying for a mortgage, which may be subject to very strict authentication requirements.

In some embodiments, the user behavior model may include a set of rules and/or stored operations for each inferred user visit reason. An inferred user visit reason may be associated with one or more authentication requirements that the user must satisfy in order to be successfully authenticated. In some embodiments, the one or more authentication requirements include describing one or more required user feature types and/or user feature sub-types as well as one or more authentication threshold values for the user feature types and/or user feature sub-types for the corresponding inferred user visit reason. An authentication threshold value may be associated with a user feature type and/or user feature sub-type and describe a numerical value that is indicative of user identification feature confidence score for that user feature type and/or user feature sub-type required to make a determination of successful authentication. Otherwise, the user may not be successfully authenticated. In some embodiments, an inferred user visit reason may have multiple options for successful authentication. In some embodiments, the one or more authentication requirements may be output and/or formatted as a list, vector, array, and/or the like.

For example, the authentication model may determine that for an inferred user reason visit reason A, at least two biometric feature types are required, and each associated user identification feature confidence score must be greater than or equal to 0.5. As such, if a user's voice and face are captured and determined as captured user features (e.g., both of the biometric user feature type) and are further determined to have user identification feature confidence scores above 0.5, then the user may be successfully authenticated. As another example, the authentication model may determine that for an inferred user reason visit reason B, at least two captured user features of any type are required and a combined user identification feature confidence score for the captured user features must be greater than or equal to 1.8. As such, if a MAC address for the user's cellphone is a first captured user feature and determined to exactly match a stored MAC address for the user's cellphone to yield a user identification feature confidence score of 1 and a gait analysis pattern for the user is a second captured user feature determined to yield a user identification feature confidence score of 0.8, the user is successfully authenticated.

Returning now to FIG. 4, as shown by operation 410, the apparatus 200 includes means, such as processor 202, memory 204, user authentication circuitry 214, or the like, for performing one or more user authentication determinations. The user authentication circuitry 214 may perform the one or more user authentication determinations based on the user identification feature confidence scores for the captured user features and the one or more user requirements. In some embodiments, the user authentication circuitry 214 may use one or more authentication models to perform the one or more user authentication determinations. The authentication model may output an indication of a user authentication status, such as by generating a user information report.

An authentication model may process one or more authentication requirements and perform one or more authentication determinations to determine whether the user is successfully authenticated. In some embodiments, the authentication model may be a rules-based model (e.g., a tree-based model) configured to determine whether the one or more user identification feature confidence scores and/or captured user features satisfy the one or more authentication requirements for the inferred user visit reason. The authentication model may compare the user identification feature confidence scores, each associated with a captured user feature of a user feature type and/or user feature sub-type, to the one or more authentication requirements to determine whether the authentication requirements are satisfied. In an instance the authentication requirements are satisfied, the authentication model may determine that the user is successfully authenticated. In some embodiments, in an instance multiple inferred user visit reasons are determined, the authentication model may be configured to abide by the strictest authentication requirements.

In an instance the user is not successfully authenticated, a determination of unsuccessful authentication may be made. Depending on the configuration of the system, once an unsuccessful authentication is determined, the entire authentication may be determined to fail. Alternatively, in some embodiments, the authentication model may generate and provide one or more additional authentication requests to one or more user devices and/or facility devices. The one or more additional authentication requests may describe a request for one or more additional captured user features for the user, which may be determined based on the authentication requirements and the current captured user feature and associated user identification feature confidence scores.

As shown in FIG. 4, operation 412 may be performed after performing the user authentication determination. Additionally, operation 702 may be performed, described below in connection with FIG. 7, and may continue to operations 704 through 708 based on the outcome of the user authentication determination.

Figure 7:
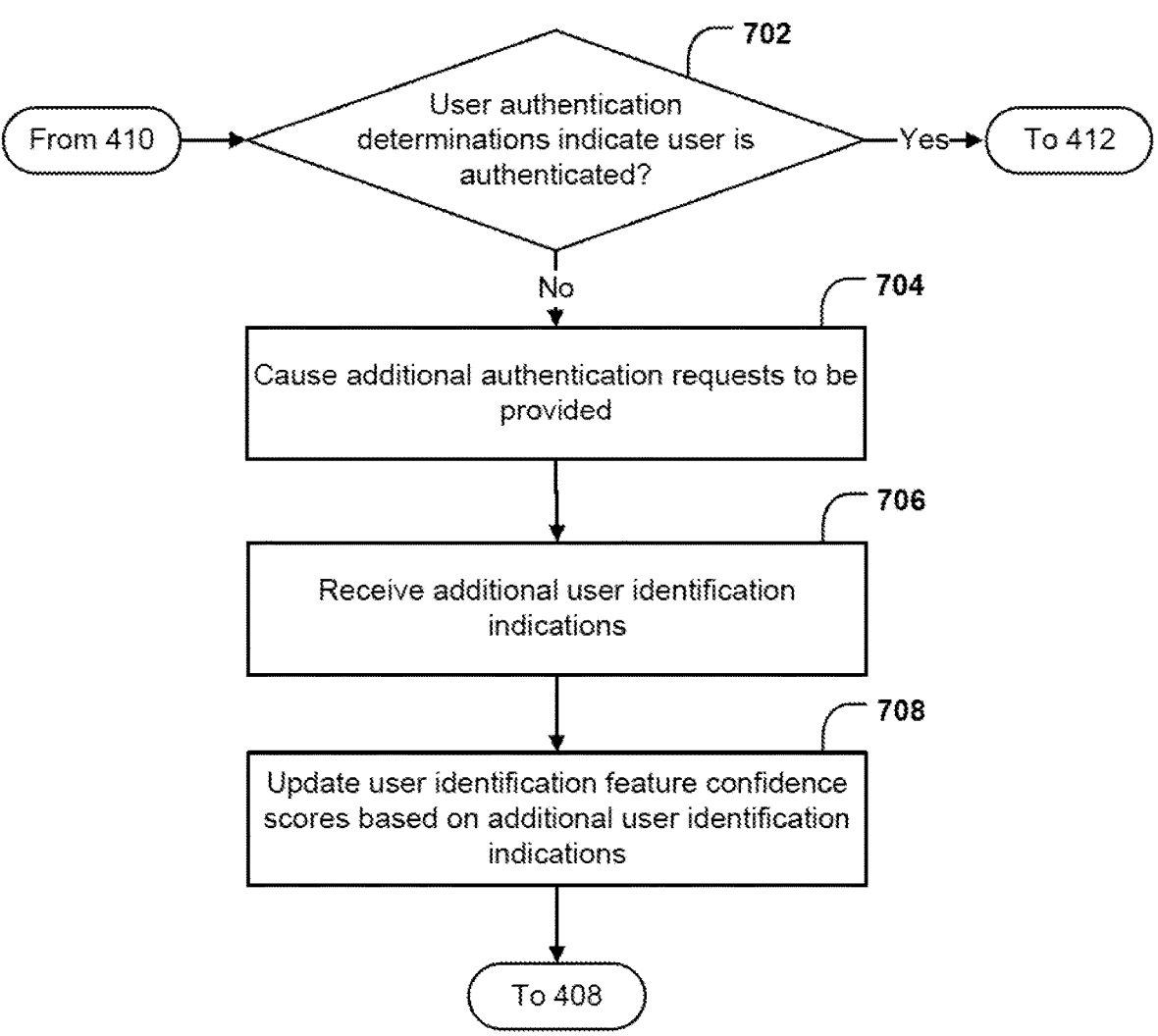
FIG. 7 illustrates an example flowchart for providing additional user authentications, in accordance with some example embodiments described herein.

Turning now to FIG. 7, example operations are shown for generating additional user identification attempts. As mentioned previously, control may flow to operation 702 after completion of operation 410. As shown by operation 702, in an instance one or more of the one or more user authentication determinations indicates the first user is not authenticated, control may flow to operation 704. Otherwise, the flow may proceed to operation 412.

As shown by operation 704, the apparatus 200 includes means, such as processor 202, memory 204, communications hardware 206, or the like, for causing one or more additional authentication requests to be provided. The apparatus 200 may utilize communications hardware 206 to directly provide an authentication request to the first user via an appropriate user device 110A through user device 110N, and may additionally or alternatively provide an authentication request via one or more facility devices 112A-112N. For example, a push notification may be sent to a first user's user device 110A, which may be a mobile phone, and the push notification may direct the user to a login page of a pre-installed application. For another example, a facility device 112A may notify an agent that a particular user requires additional authentication, provide an image of the particular user and relevant information from a database of user profile features. The agent may then perform the authentication procedure in person, for example, by reviewing an identification document, and approve the user authentication using the same facility device 112A.

As shown by operation 706, the apparatus 200 includes means, such as processor 202, memory 204, communications hardware 206, or the like, for receiving one or more additional user identification indications in response to the one or more additional authentication requests. As mentioned previously, user identification indications may be any of a number of data types that may be used to identify a user. User identification indications may uniquely identify a user, such as in the case of a user identification number or login name, or may provide a degree of probability of identifying a user, such as a still image captured from a camera where the user is partially obscured. In the event that one or more user identification indications provide only a degree of probability of identifying the user, a plurality of user identification indications may be considered together when attempting to identify the user. In some embodiments, the one or more user identification indications may include one or more of biometric data, image data, audio data, or user device data. In some embodiments, the additional user identification indications may be provided in response to the additional authentication requests of operation 704, or may be received independently of such requests. The additional user identification indications may have previously been stored in a storage device 106 as set forth in FIG. 1, which may comprise memory 204 of the apparatus 200 or a remote storage device 106 accessible by the apparatus 200 using communications hardware 206 or the like. In such cases, the additional user identification indications may be retrieved by the apparatus 200 unilaterally. However, the additional user identification indication may be received from a separate device with which a user interacts (e.g., one of user device 110A through user device 110N or facility device 112A through facility device 112N), in which case the additional user identification indications may be received via communications hardware 206. If the user interacts directly with the apparatus 200, the additional user identification indications may be received via attached input devices of the communications hardware 206.

In some embodiments, the one or more additional user identification indications are received from one or more facility devices 112A through 112N or a user device 110A through user device 110N of the first user. The facility devices 112A through 112N may be cameras, wireless network devices, biometric sensors, microphones, or the like, or may include such devices attached as peripherals to computer systems. For example, at a brick-and-mortar bank branch, facility devices may include security cameras around the building, biometric sensors located in the building lobby, a high-definition camera near the front door of the building, traffic cameras and motion detectors to detect vehicles in the parking lot, microphones located at customer service stations, and network devices designed to detect a user's phone or other device in proximity to the building's wireless network. User devices may include any portable computing device such as laptop computers, tablet computers, smart books, palm-top computers, personal computers, smartphones, PDAs, wearable devices (such as headsets, smartwatches, or the like), and similar electronic devices.

Finally, as shown by operation 708, the apparatus 200 includes means, such as processor 202, memory 204, communications hardware 206, user identification circuitry 210, or the like, for updating the one or more user identification feature confidence scores based on the one or more additional user identification indications. The one or more user identification feature confidence scores may be updated in a similar manner or fashion as described in operation 406 of FIG. 4. The user identification circuitry 210 may receive the additional user identification indications, and may further receive additional information from one or more user devices 110A-110N and/or facility devices 112A-112N to compute the updated one or more user identification feature confidence scores. The received additional user data may be processed and compared with one or more user profile features stored in memory 204, or stored remotely and accessed via communications hardware 206, and the comparison may form the basis for computation of the updated user identification feature confidence scores. In some embodiments, the updated user identification feature confidence scores may replace a previously computed user identification feature confidence score. For example, a user may stand in front of a camera for a photograph used for facial recognition while wearing a hat. The authentication may fail, and the apparatus 200 may prompt the user to remove the hat and use the additional user identification indication of the second photograph without a hat in order to update the user identification feature score, replacing the previous user identification feature score computed with the photograph in which the user wore a hat. In some embodiments, new user identification feature scores that were not previously computed in the same session may be requested. For example, a failed password authentication may result in the apparatus 200 issuing a prompt for a biometric scan authentication, or another method.

As shown in FIG. 7, control may flow back to operation 408 after completion of operation 708, which causes a control loop as the apparatus 200 may perform additional authentication attempts until a successful determination is made. As described previously, user identification feature confidence scores may be numerical values that provide a measure of confidence of verifying the identity of the user for authentication purposes.

Returning now to FIG. 4, as shown by operation 412, the apparatus 200 includes means, such as processor 202, memory 204, communications hardware 206 or the like, for providing a user information report, which may provide a summary of the user authentication process. In particular, the user information report may include the one or more user authentication determinations (e.g., authenticated or not authenticated), the one or more inferred user visit reasons, and/or any additional information gathered by the system that may be needed for user authorization to access needed services (e.g., as determined via the inferred user visit reasons). The user information report may be provided in both a human-readable format, for example, to present to agents at a brick-and-mortar bank branch, as well as in a computer-readable format to be provided to additional circuitry or systems that may make an authorization determination. The user information report may further include authentication threshold values, user identification indications, and/or user identification feature confidence scores for the user.

To provide the user information report, the communications hardware 206 may transmit the report, which may be received from other circuitry such as the user authentication circuitry 214, and formatted by the processor 202 or retrieved from memory 204. The user information report may be transmitted to one or more facility devices 112A-112N or other systems operated by agents who may use the information of the report during customer interactions, for example.

As shown by operation 414, the apparatus 200 may include means, such as communications hardware 206, or the like, for providing, based on the one or more user authentication determinations, an action notification related to an associated action to be taken by the first user to a user device associated with the first user. In some embodiments, the action notification is sent to a user device (e.g., one of user device 110A through user device 110N) of the first user. Alternatively or additionally, the action notification may be sent to a facility device (e.g., one or more of facility device 112A through facility device 112N). The action notification may relate to an associated action that the first user is authorized to perform. For example, the action notification may include computer-executable instructions that cause the user device of the user to display a message indicating to the user to proceed to a particular location and/or have certain documents ready to show (e.g., a driver's license, passport, etc.). As another example, the action may include computer-executable instructions that cause a facility device to perform a particular action with respect to the user, such as unlock an entrance doorway, display a message to the user to proceed to a particular location, and/or the like.

Figure 9:
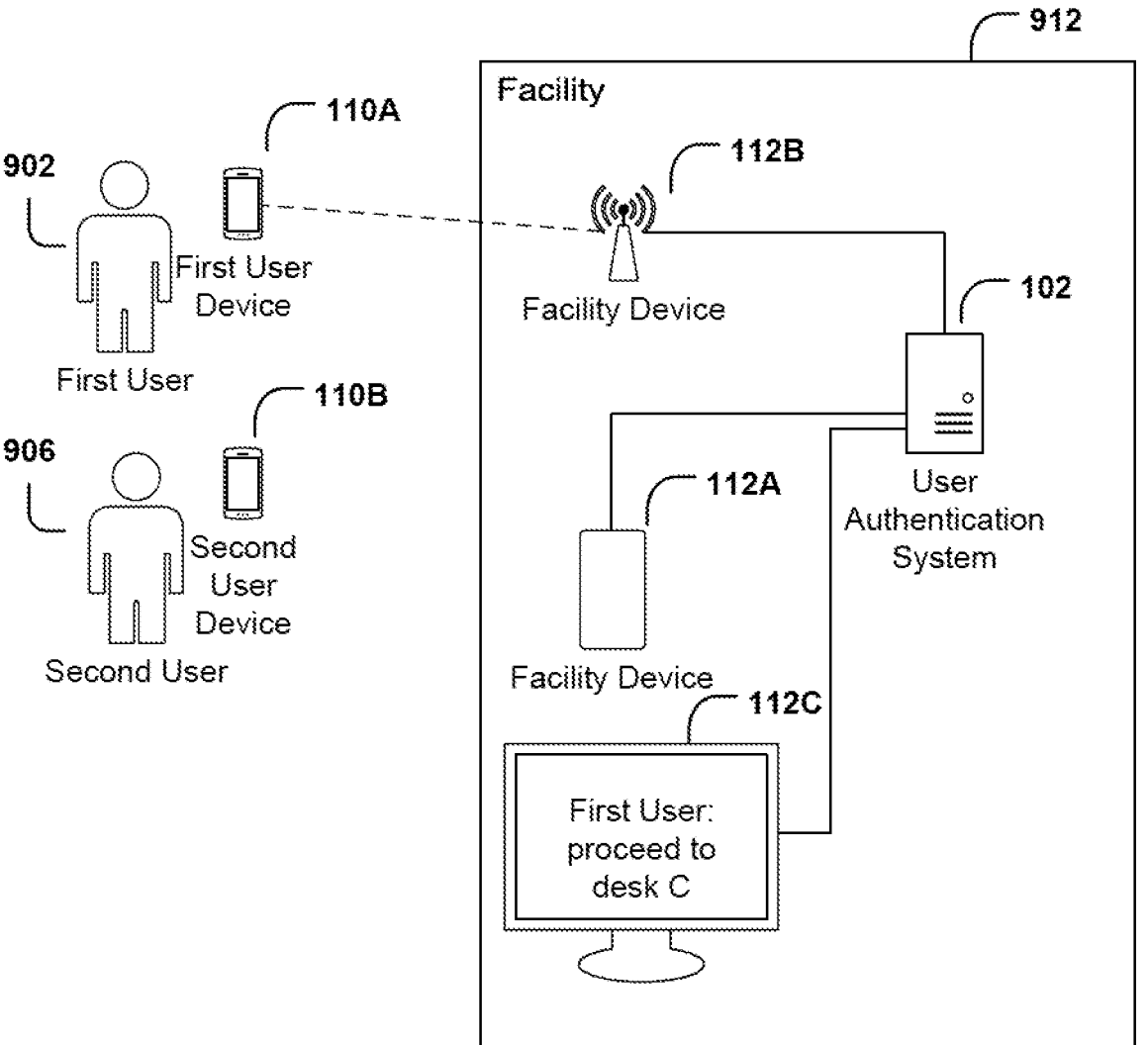
FIG. 9 illustrates an example environment in which example apparatuses and circuitries may be physically situated to provide a user authentication determination.

Turning now to FIG. 9, an example environment in which the apparatus 200, apparatus 300 and other circuitries may be physically situated to provide a user authentication determination is shown. The first user 902 may approach a facility 912, which may be a physical location, such as a brick-and-mortar retail location or bank. The user authentication system 102 may utilize facility devices 112A-112C, and/or the first user device 110A to receive user identification indications. The first user device 110A belonging to the first user 902 may be detected via the facility device 112B which is positioned at the entrance of the facility 912 and a system device 104 (not shown) of the user authentication system may generate a proximity detection alert. Note that signals from the second user device 110B belonging to a second user 906 may be detected but not considered for the authentication of the first user 902 after the facility device 112B detects the first user device 110A. After performing a successful authentication of the first user 902, the user authentication system 102 may cause a message to display on an attached display of facility device 112C via an action notification, which may be positioned at the beginning of a customer service line. The message may direct the first user to a particular location, such as to a particular agent desk, room, or location.

Example System Interaction

Figure 8A:
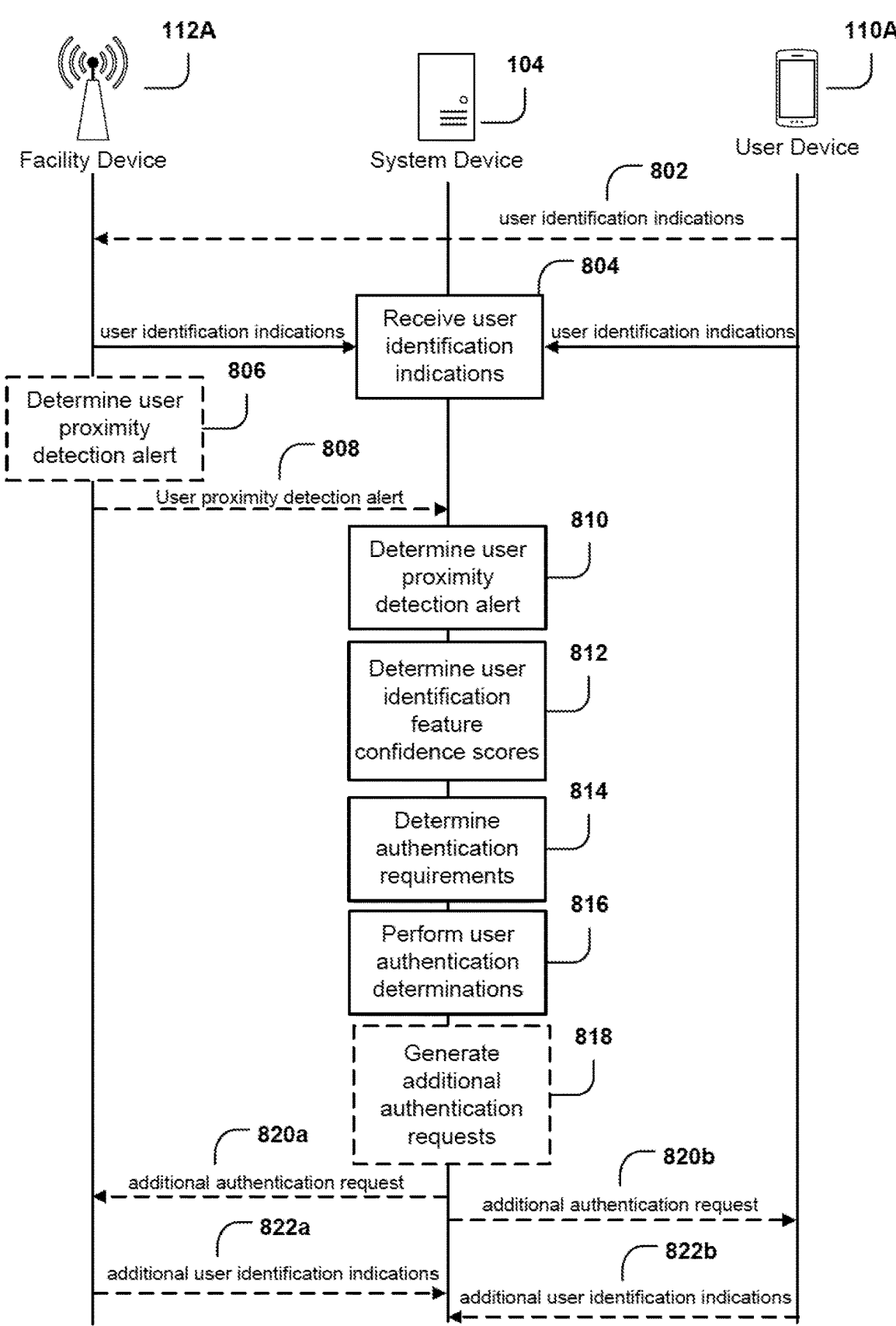
FIGS. 8A-8B illustrates a swim-lane diagram with example operations performed by components of the environment depicted in FIG. 1, in accordance with some example embodiments described herein.
Figure 8B:
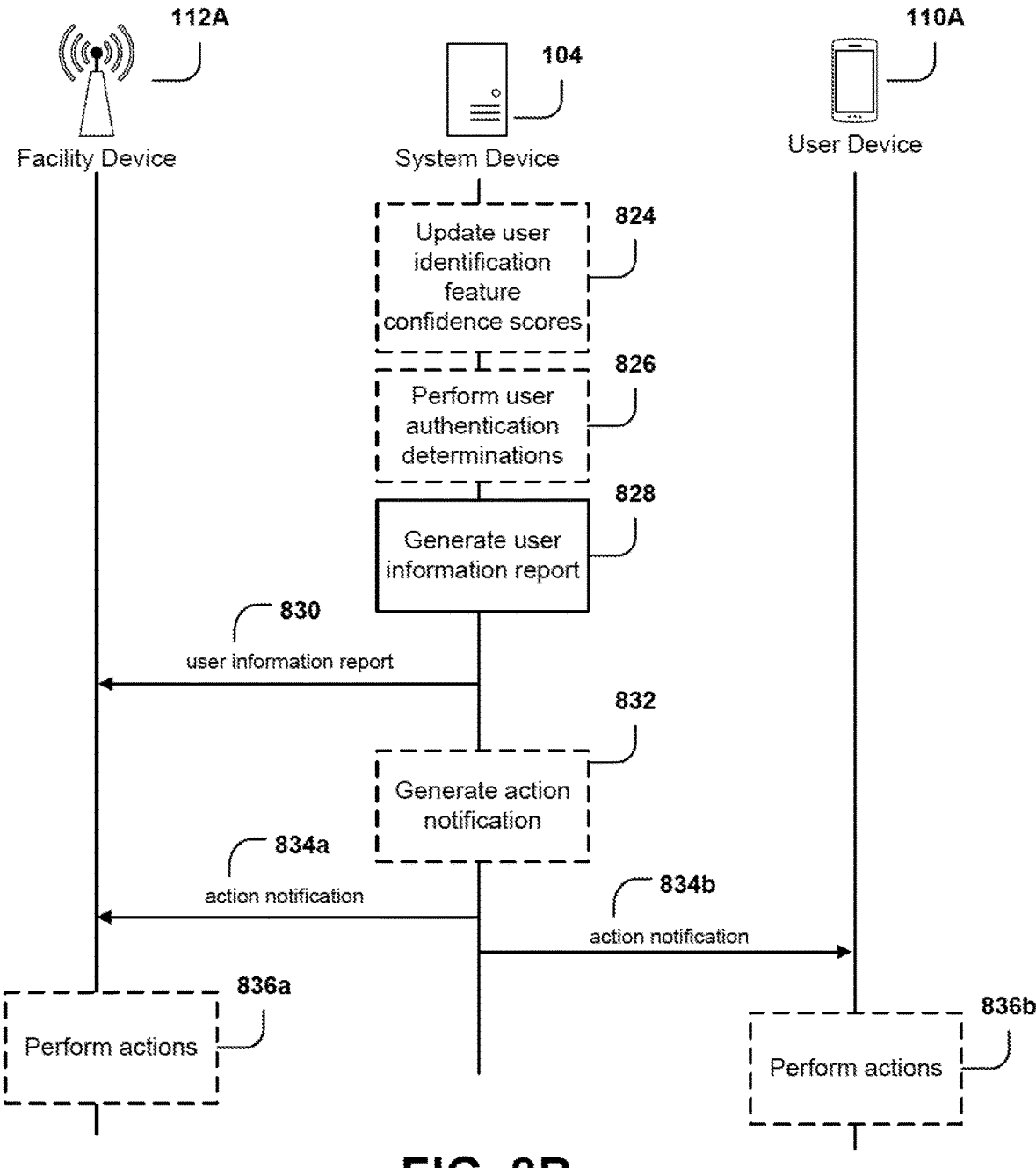

FIGS. 8A-8B shows a swim lane diagram illustrating example operations (e.g., as described above in connection with FIGS. 4-7) performed by components of the environment depicted in FIG. 1 to produce various benefits of the implementations described herein. The operations shown in the swim lane diagram performed by system device 104 are shown along the line extending from the box labeled "system device," operations performed by a facility device 112A-112N are shown along the line extending from the box labeled "facility device," and operations performed by a user device 110A-110N are shown along the line extending from the box labeled "user device." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 8A-8B.

Turning first to FIG. 8A, optionally at operation 802, one or more facility devices 112A-112N may receive one or more user identification indications from a user device 110A. At operation 804, system device 104 receive user identification indications from facility device 112A and/or user device 110A. Optionally at operation 806, the facility device 112A determines a user proximity detection alert. Optionally at operation 808, the facility device 112A provides the user proximity detection alert to system device 104. At operation 810, the system device 104 determines a user proximity detection alert. The system device 104 may determine this based on processing of the user identification indications or in response to receiving the user proximity detection alert from facility device 112. At operation 812, system device 104 may determine one or more user identification feature confidence scores based on the received user identification indications. At operation 814, the system device 104 may determine one or more authentication requirements for each of one or more inferred user visit reasons determined for the first user. At operation 816, system device 104 may perform one or more authentication determinations. Optionally at operation 818, system device 104 may generate additional authentication requests. Optionally at operations 820a and 820b, system device 104 may provide an additional authentication request to facility device 112A and/or user device 110A, respectively. Optionally at operations 822a and 822b, the facility device 112A and/or user device 110A may provide one or more additional user identification indications to system device 104.

Turning now to FIG. 8B, optionally at operation 824, system device 104 may update the user identification feature confidence scores. Optionally at operation 826, the system device 104 may perform user authentication determinations based on the updated user identification feature confidence scores. At operation 828, the system device 104 may generate a user information report. At operation 830, the system device 104 may provide the user information report to facility device 112A (and/or another facility device not shown). Optionally at operation 832, the system device 104 may generate one or more action notifications. Optionally at operations 834a and 834b, the system device 104 may provide an action notification to facility device 112A and/or user device 110A, respectively. Optionally at operations 836a and/or 836b, the facility device 112A and/or user device 110A may perform actions based on the received action notification, respectively.

As described above, example embodiments provide methods and apparatuses that enable improved user authentication. Example embodiments overcome difficulties customers may face when needing to be authenticated for services at physical locations. By automating the process of authentication, example embodiments save time and avoid manual intervention by customers, which may degrade the customer experience. Additionally, example embodiments may dynamically alter authentication thresholds based on the level of security needed for certain actions in order to ensure security standards are met while still providing a more streamline experience for customers. As these examples all illustrate, example embodiments contemplated herein provide technical solutions that solve real-world problems faced during user authentication.

FIGS. 4-9 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for automatically authenticating a first user, the method comprising:

receiving, by communications hardware, a user identification indication pertaining to the first user, wherein the user identification indication is captured automatically by a facility device associated with a facility;

determining, by user identification circuitry, a user identification feature confidence score based on the user identification indication and one or more user profile features associated with the first user;

identifying, by user objective analysis circuitry, user activity data for the first user, wherein the user activity data comprises at least one of (i) a user browsing history and (ii) a historical social media communication;

determining, by the user objective analysis circuitry and based on the user activity data, an inferred user visit reason for the first user;

determining, by the user objective analysis circuitry, an authentication requirement for the inferred user visit reason;

performing, by user authentication circuitry, a user authentication determination based on the user identification feature confidence score and the authentication requirement; and providing, by the communications hardware, a user information report to a facility device associated with an agent at the facility, wherein the user information report comprises the user authentication determination.

2. The method of claim 1, wherein the user activity data further comprises one or more of:

user location data history;

user interactions with application prompts; or historical user data.

3. The method of claim 1, further comprising:

determining, by the user objective analysis circuitry and using a user behavior model, a user behavior pattern for the first user based on the user activity data, wherein determining the inferred user visit reason is based on the user behavior pattern.

4. The method of claim 1, wherein the method further comprises, receiving, by the communications hardware, an additional user identification indication from a user device of the first user.

5. The method of claim 1, wherein determining the user identification feature confidence score comprises:

determining, by the user identification circuitry, one or more captured user features described by the user identification indication;

accessing, by the user identification circuitry, the one or more user profile features associated with the first user which correspond to the one or more captured user features; and determining, by the user identification circuitry and using one or more user feature confidence determination models, the user identification feature confidence score by comparison of each captured user feature and a corresponding user profile feature.

6. The method of claim 1, wherein the user identification indication comprises one or more of biometric data, image data, audio data, or user device data.

7. The method of claim 1, further comprising:

providing, by the communications hardware and based on the user authentication determination, an action notification related to an associated action to be taken by the first user to a user device associated with the first user.

8. The method of claim 1, further comprising determining, by proximity detection circuitry, a user proximity detection alert based on the user identification indication.

9. The method of claim 1, further comprising determining, by the user objective analysis circuitry and using a user behavior model, a match between a historical condition of a historical recorded transaction from the user activity data and a present condition, wherein determining the inferred user visit reason is based on the match.

10. The method of claim 1, wherein the authentication requirement describes (a) a user feature type and (b) an authentication threshold value associated with the inferred user visit reason;

wherein performing the user authentication determination comprises:

determining, by the user authentication circuitry, whether the user identification indication corresponds to the user feature type;

in response to determining that the user identification indication corresponds to the user feature type, determining, by the user authentication circuitry, whether the user identification feature confidence score associated with the user identification indication satisfies the authentication threshold value;

in response to determining that the user identification feature confidence score satisfies the authentication threshold value, determining, by the user authentication circuitry, that the first user is successfully authenticated.

11. The method of claim 1, further comprising:

in an instance in which the user authentication determination indicates the first user is not authenticated, causing, by the communications hardware, one or more additional authentication requests to be provided.

12. The method of claim 11, further comprising:

receiving, by the communications hardware, one or more additional user identification indications in response to the one or more additional authentication requests; and updating, by the user identification circuitry, the user identification feature confidence score based on the one or more additional user identification indications.

13. An apparatus for automatically authenticating a first user, the apparatus comprising:

communications hardware configured to receive a user identification indication pertaining to the first user, wherein the user identification indication is captured automatically by a facility device associated with a facility;

user identification circuitry configured to determine a user identification feature confidence score based on the user identification indication and one or more user profile features associated with the first user;

user objective analysis circuitry configured to:

identify user activity data for the first user, wherein the user activity data comprises at least one of (i) a user browsing history and (ii) a historical social media communication, determine, based on the user activity data, an inferred user visit reason for the first user, and determine an authentication requirement for the inferred user visit reason; and user authentication circuitry configured to perform a user authentication determination based on the user identification feature confidence score and the authentication requirement, wherein the communications hardware is further configured to provide a user information report to a facility device associated with an agent at the facility, wherein the user information report comprises the user authentication determination.

14. The apparatus of claim 13, wherein the user activity data further comprises one or more of:

user location data history;

user interactions with application prompts; or historical user data.

15. The apparatus of claim 13, wherein the user objective analysis circuitry is further configured to determine, using a user behavior model, a user behavior pattern for the first user based on the user activity data, wherein determining inferred user visit reason is based on the user behavior pattern.

16. The apparatus of claim 13, wherein the communications hardware is further configured to receive an additional user identification indication from a user device of the first user.

17. The apparatus of claim 13, wherein the user identification circuitry is configured to determine the user identification feature confidence score by:

determining one or more captured user features described by the user identification indication;

accessing the one or more user profile features associated with the first user which correspond to the one or more captured user features; and determining, using one or more user feature confidence determination models, the user identification feature confidence score by comparison of each captured user feature and a corresponding user profile feature.

18. The apparatus of claim 13, wherein the user identification indication comprises one or more of biometric data, image data, audio data, or user device data.

19. The apparatus of claim 13, wherein the communications hardware is further configured to in an instance in which the user authentication determination indicates the first user is not authenticated, cause one or more additional authentication requests to be provided.

20. A computer program product for automatically authenticating a first user, the computer program product comprising at least one non-transitory computer-readable storage medium storing software instructions that, when executed, cause an apparatus to:

receive one or more user identification indications pertaining to the first user, wherein at least one of the one or more user identification indications is captured automatically by a facility device associated with a facility;

determine a user identification feature confidence score based on the one or more user identification indications and one or more user profile features associated with the first user;

identify user activity data for the first user, wherein the user activity data comprises at least one of (i) a user browsing history and (ii) a historical social media communication;

determine, based on the user activity data, an inferred user visit reason for the first user;

determine an authentication requirement for the inferred user visit reason;

perform a user authentication determination based on the user identification feature confidence score and the authentication requirement; and provide a user information report to a facility device associated with an agent at the facility, wherein the user information report comprises the user authentication determination.

* * * * *